Nov. 21, 1967     G. H. PERRYMAN     3,353,487
DEVICE FOR MEASURING FLIGHT DISTANCE OF A MISSILE
Filed May 11, 1966     2 Sheets-Sheet 1
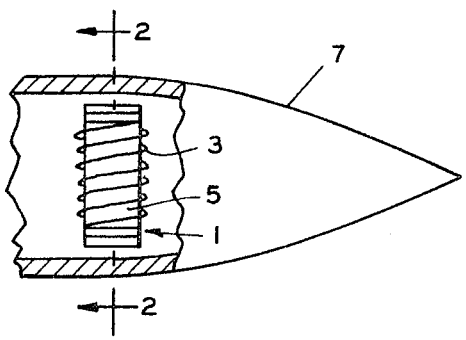
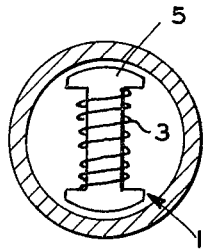
FIG. 1     FIG. 2
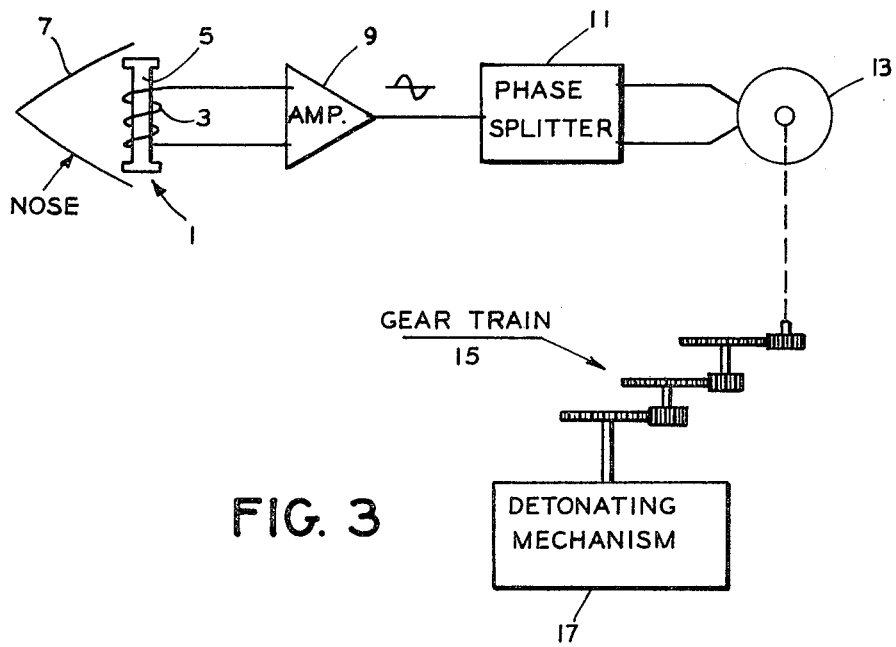
FIG. 3
INVENTOR.
GEORGE H. PERRYMAN
BY
ATTORNEY

United States Patent Office 3,353,487
Patented Nov. 21, 1967

3,353,487
DEVICE FOR MEASURING FLIGHT
DISTANCE OF A MISSILE
George H. Perryman, Teaneck, N.J., assignor to The
Bendix Corporation, a corporation of Delaware
Filed May 11, 1966, Ser. No. 549,387
15 Claims. (Cl. 102—70.2)

ABSTRACT OF THE DISCLOSURE

An artillery shell adapted to be fired from a gun barrel having rifling of known pitch so that the artillery shell travels a known distance per revolution, including a pick-up coil arranged to rotate in the earth's magnetic field with the artillery shell and providing an electric signal corresponding to the number of revolutions of the artillery shell. The artillery shell has a counter for counting the number of revolutions of the artillery shell and detonating means for exploding the artillery shell after a predetermined number of revolutions corresponding to target distance.

---

This invention relates to armed missiles and more particularly to devices for measuring flight distance.

Heretofore, flight distance of a missile, such as an artillery shell, was measured by determining time of flight in accordance with the well known relationship:

$$D = VT$$

where:
$D$ = flight distance
$V$ = velocity of the missile
$T$ = time of flight

A mechanical timer is used to measure flight time to the target. The timer usually includes a clockwork with an escapement mechanism driven by a spring to operate a tripping device which actuates a detonator to explode the missile. The timer is set for a measured time interval corresponding to target distance by a graduated drum.

The timer, as used heretofore, is subject to three principal sources of error which have become more significant with higher artillery shell velocities and more rigid demands for accuracy.

(1) The mechanical timer is subject to inherent errors of about ± two-tenths percent.
(2) The timer is affected by conditions of flight, that is missiles spin velocities now are as high as 30,000 r.p.m. and this imposes severe centrifugal forces on the timer which adds to the inherent errors of the timer.
(3) The missile is assumed to fly at a constant predetermined velocity. However, muzzle velocity varies with variations in powder charge. Also shell velocity is not constant because it is affected by atmospheric conditions, such as barometric pressure and temperature and the velocity of the missile gradually decreases in flight.

One object of the present invention is to eliminate the need for a timer by measuring flight distance.

Another object of the invention is to count the number of revolutions of the missile as a measure of flight distance.

Another object is to provide a revolution counter which counts the number of revolutions of the missile and detonates the missile after a predetermined number of revolutions as a measure of distance from the firing point.

Another object of the invention is to provide a revolution counter which counts the revolutions of a missile and is unaffected by centrifugal forces.

Another object of the invention is to provide a revolution counter for a missile which may be used for determining flight distance to the target and which is unaffected by acceleration, missile velocity or barometric pressure and temperature.

Another object of the invention is to provide a revolution counter for counting the number of revolutions of a body in the earth's magnetic field.

Another object is to provide a revolution counter of the kind described which is of relatively simple construction, is highly reliable, and has no moving parts.

To utilize applicant's invention as applied to an artillery shell it is only necessary to know the pitch of the helix traced by a point on the shell's surface during flight. This is readily determined since it is the same as the pitch of the rifling of the gun barrel. The simple relationship:

(I) Distance = Number of revolutions × pitch determines the point of detonation.

The invention contemplates a revolution counter for a body rotating in the earth's magnetic field, including a transducer having a pick-up coil wound on a magnetically permeable core mounted transversely within the body and arranged to cut the component of the earth's magnetic field lying in a plane perpendicular to the axis of the body. The transducer generates an alternating current voltage having a frequency equal to the spin velocity of the body and a magnitude measured by the well known relation:

(II) $\quad E = 4.44\, fnAB \times 10^{-8}$ volts where:

$f$ = frequency in cycles or revolutions per second
$n$ = number of turns of wire on the coil
$A$ = is effective core area in square centimeters, and
$B$ = flux density in gauss An approximate calculation of output from the transducer using conservative assumptions and worst conditions produces an alternating current which is readily usable. Assuming a minimum field intensity H of .25 gauss (found in Brazil), and an effective $\mu$ of 600, then since (III) $\quad B = \mu H$ (IV) $\quad B = 600 \times .25 = 150$ gauss at right angles to the earth's field vector. Even if the body travels at an angle of only one degree to the field vector, then the minimum value is (V) $\quad B_{1°} = \sin 1° \times B = .017 \times 150 = 2.6$ gauss If the transducer includes a coil of 1000 turns and a core area of one square centimeter and the body spins at a speed of 100 revolutions per second, then substituting these values in Equation II (VI) $\quad E = 4.44 \times 100 \times 1000 \times 1 \times 2.6 \times 10^{-8}$ volt
(VII) $\quad E = .012$ volt or 12 millivolts The signal from the transducer is readily amplified to a voltage level where it can be suitably shaped and used for transmission of angular velocity to a ground station or it may be coupled to an on-board computer for directly providing distance information.

When the revolution counter is used on an artillery shell for measuring distance, the amplified signal from the transducer may be phase split and used to energize a synchronous motor drivably connected to a detonating mechanism of the kind presently in use. If a system with no moving parts is desired, then the amplified signal from the transducer may be converted by a pulse converter to pulses which are applied to a counter. The counter is preset for a selected target distance and the pulses are counted by the counter to a predetermined number, whereupon an electrical detonator is actuated to explode the shell.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only and are not to be construed as defining the limits of the invention.

In the drawings:

FIGURE 1 is a plan view partially cut away showing a novel transducer constructed according to the invention and mounted in the nose of an artillery shell.

FIGURE 2 is a transverse vertical section taken on the line 2—2 of FIGURE 1.

FIGURE 3 shows a novel revolution counter constructed according to the invention for actuating a detonating mechanism in an artillery shell a predetermined distance from the firing point.

Figure 4:
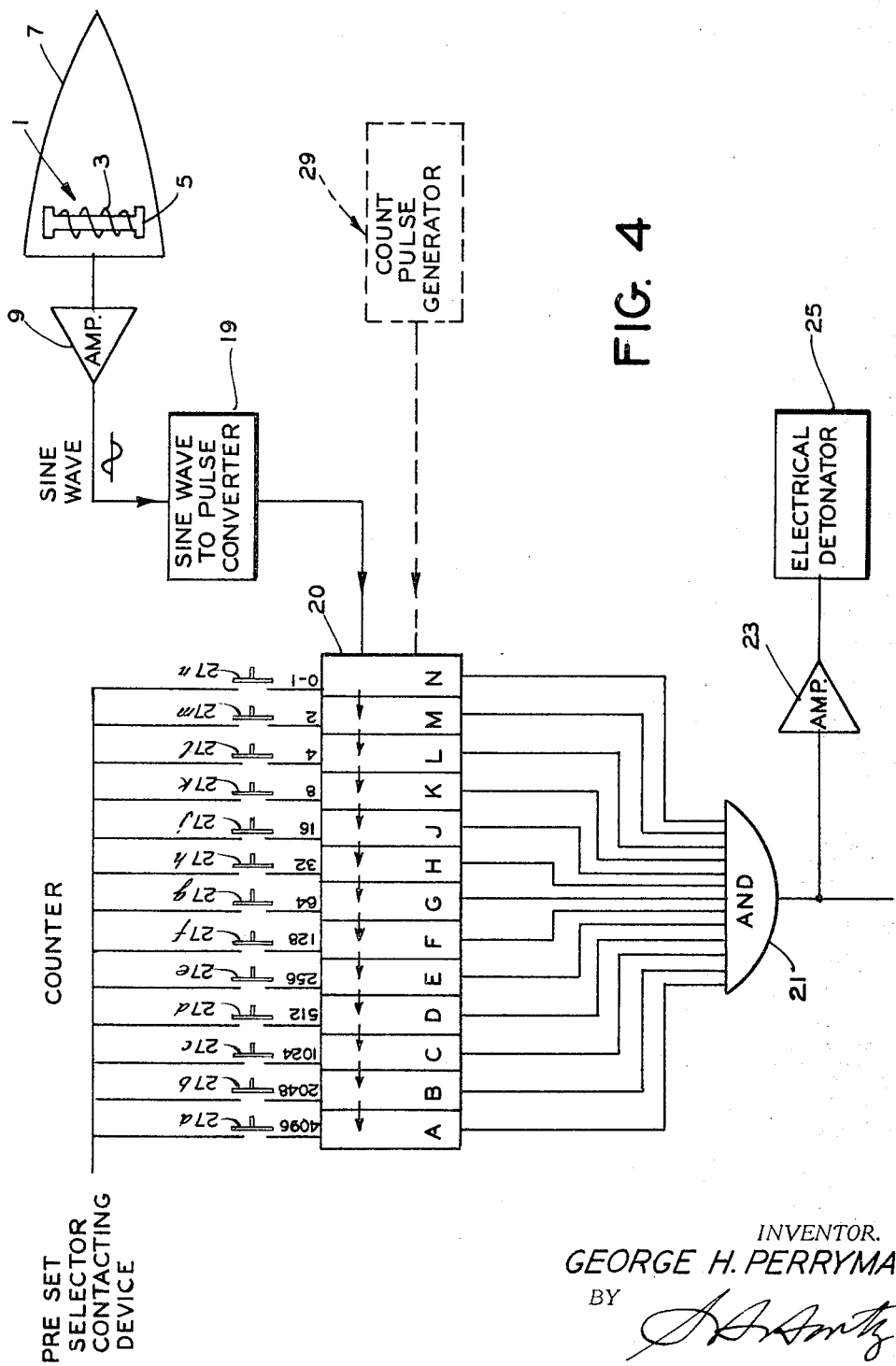
FIGURE 4 shows another embodiment of the invention having no moving parts and which uses a pulse generator and counter for actuating an electrical detonator.

The novel revolution counter constructed according to the invention is shown in the drawings as comprising a transducer 1 including a pick-up coil 3 wound on a core 5 of magnetically permeable material. The core 5 is fixedly mounted in the nose or other suitable location of a missile 7 as shown in FIGURES 1 and 2. The nose or portion of the missile adjacent the pick-up coil is of non-magnetic material, such as plastic or any of a large number of metals or alloys, such as brass or 18–8 stainless steel. When the missile is ejected from the muzzle of the gun barrel, the rifling in the gun barrel rotates the missile and the transducer generates an alternating voltage as it rotates in the earth's magnetic field. The coil preferably is wound to form two poles so that the frequency of the alternating voltage is the same as the speed of rotation of the missile, that is, one cycle is generated as the missile makes a complete revolution.

In the embodiment shown in FIGURE 3, pick-up coil 3 of transducer 1 is connected to an amplifier 9 and the alternating voltage from the pick-up coil is suitably amplified, and the amplified voltage is applied to a phase splitter 11 connected to amplifier 9. A synchronous motor 13 is connected to the phase splitter and is energized by the phase split voltage. The synchronous motor 13 is drivably connected through a gear train 15 to a detonating mechanism 17 which may be of the kind presently in use and heretofore driven by a clock-work mechanism. The detonating mechanism may include a tripping device set manually for a number of revolutions corresponding to target distance. The detonating mechanism explodes the missile when the tripping device is operated.

In the embodiment of the invention shown in FIGURE 4 pick-up coil 3 of transducer 1 is connected to an amplifier 9 which amplifies the alternating voltage from the transducer to a suitable level. A sine wave to pulse converter 19, which may be of the kind shown at page 100 in FIG. 7.6a, Elements of Transistor Pulse Circuits, by T. D. Towers, published by D. Van Nostrand Company, Inc., Princeton, N.J., converts the amplified voltage to pulses which are applied to a counter 20.

In the embodiment shown, counter 20 has thirteen stages A–N, but any number of stages may be used depending on the maximum target distance to be measured. Each stage of the counter may be of the kind shown at page 142 in FIG. 10.3a of the above reference. The counter counts the number of pulses from a digital number preset into the counter in accordance with target distance and stages A–N are connected to an AND gate 21. When the count reaches the predetermined number, AND gate 21 passes a signal to an amplifier 23 connected thereto and the amplified signal operates an electrical detonator 25 connected to the amplifier to explode the missile.

Any suitable arrangement may be used to preset a digital number in the counter in accordance with target distance. One arrangement uses switch contacts 27a–27n, respectively, to preset the associated stages A–N to the "one" position.

An alternate arrangement is to use a pulse generator 29 to provide a number of pulses to the counter in accordance with target distance to preset a digital number in the counter. The preset number is the maximum count, which in the case of a thirteen stage counter is 8191, minus the number of revolutions which the missile must make prior to detonation. After the missile is fired, the pulses from converter 19 are counted by the counter at a rate corresponding to one pulse, for example, for each revolution of the missile. Each stage A–N not previously set to a "one" position is advanced to the "one" position until all stages are in the "one" position, whereupon AND gate 21 transmits a pulse to amplifier 23 to trigger detonator 25.

As an example of the number preset into the counter, if the number of revolutions required between firing and detonation at the target is 5100, the number to be preset into the counter is the maximum count 8191 minus the number of revolutions 5100 which equals 3091. The binary number corresponding to 3091 requires that stages B, C, J, M, and N be preset to the "one" position since

B _____ 2048
C _____ 1024
J _____ 16
M _____ 2
N _____ 1

Total _____ 3091

Operating contacts 27b, 27c, 27j, 27m, and 27n preset stages B, C, J, M, and N to the "one" position and preset the number 3091 in the counter. The missile then must rotate 5100 times after firing before the missile is exploded at the target by the detonator. As mentioned above, count pulse generator 29 may be used to preset the number 3091 into the counter instead of operating the contacts.

A revolution counter constructed according to the present invention may be used to determine the rate of rotation of a body in flight by correlating the number of rotations to time in the well known manner. The number of rotations are telemetered to a ground station and this information is used to obtain the decay rate of body rotation.

Distance measuring equipment constructed according to the invention does not depend on constant predetermined missile velocity, which may vary considerably because of variations in muzzle velocity and varying atmospheric conditions. The distance measuring equipment is not affected by conditions of flight, that is, acceleration forces caused by high missile spin velocities. The distance measuring equipment avoids the need for accurate timing mechanism and requires only the number of revolutions of the missile as a measure of flight distance. The revolution counter is relatively simple in construction, is highly reliable, and the embodiment shown in FIGURE 4 has no moving parts.

While two embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A missile adapted to rotate in flight and to travel a known distance per revolution and having a body, a transducer including a pick-up coil wound on a core of magnetically permeable material, the transducer being arranged to rotate in the earth's magnetic field with the body and providing an electrical signal corresponding to the number of revolutions of the missile, means for counting the number of revolutions of the missile connected to the transducer and responsive to the electrical signal, and detonating means connected to the counting means for exploding the missile after a predetermined number of revolutions corresponding to a predetermined distance.

2. A missile of the kind described in claim 1 in which the body has a portion of non-magnetic material and the transducer is fixedly mounted in said portion.

3. A missile of the kind described in claim 1 which rotates about its longitudinal axis while in flight and the transducer is positioned with the core transverse to the longitudinal axis of the missile.

4. A missile as described in claim 1 in which the electrical signal from the transducer is an alternating voltage and the means for counting the number of revolutions comprises a synchronous motor connected to the transducer and responsive to the alternating voltage.

5. A missile as described in claim 1 in which the electrical signal from the transducer is an alternating voltage and the means for counting the number of revolutions comprises an amplifier connected to the pick-up coil of the transducer for amplifying the alternating voltage, a phase splitter connected to the amplifier and responsive to the amplified alternating voltage, and a synchronous motor connected to the phase splitter and responsive to the phase split amplified voltage and drivably connected to the detonating means.

6. A missile as described in claim 1 in which the means for counting the number of revolutions includes means for converting the electrical signal to pulses, and a counter connected to the converter means for counting the pulses and including means for providing a signal when the counter receives a predetermined number of pulses corresponding to target distance.

7. A missile as described in claim 1 in which the means for counting the number of revolutions includes means for converting the electrical signal to pulses for a counter connected to the converter means and counting the pulses and including means for providing a signal when the counter counts a predetermined number of pulses, and means for presetting a digital number into the counter in accordance with target distance.

8. Equipment for counting revolutions of a body rotating in the earth's magnetic field and traveling a known distance per revolution, comprising a transducer including a pick-up coil wound on a core of magnetically permeable material, the transducer being arranged to rotate in the earth's magnetic field with the body to provide an electrical signal corresponding to the number of revolutions of the body, and means connected to the transducer and responsive to the signal therefrom and providing a signal when the body makes a predetermined number of revolutions corresponding to a predetermined distance.

9. Equipment as described in claim 8 for counting revolutions of a body which rotates about its longitudinal axis while in flight, the transducer being fixedly mounted in the body with the core transverse to the longitudinal axis of the body.

10. Revolution counting equipment as described in claim 8 including means for counting the number of revolutions connected to the transducer and responsive to the electrical signal.

11. Revolution counting equipment as described in claim 10 in which the electrical signal provided by the transducer is an alternating voltage and the means for counting the number of revolutions comprises a synchronous motor connected to the transducer and responsive to the alternating voltage.

12. Revolution counting equipment as described in claim 10 in which the means for counting the number of revolutions includes means for converting the electrical signal to pulses, and a counter connected to the converter means for counting the pulses.

13. Revolution counting equipment as described in claim 10 used for measuring flight distance to a target in which the means for counting the number of revolutions includes means for converting the electrical signal to pulses, and a counter connected to the converter means for counting the pulses and including means for providing a signal when the counter receives a predetermined number of pulses corresponding to target distance.

14. Revolution counting equipment as described in claim 10 used for measuring flight distance to a target in which the means for counting the number of revolutions includes means for converting the electrical signal to pulses, and a counter connected to the converter means for counting the pulses and including means for providing a signal when the counter counts a predetermined number of pulses, and means for presetting a digital number into the counter in accordance with target distance.

15. An artillery shell adapted to be fired from a gun barrel having rifling of known pitch so that the artillery shell travels a known distance per revolution, comprising a transducer including a pick up coil wound on a core of magnetically permeable material, the transducer being arranged to rotate in the earth's magnetic field with the artillery shell and providing an electric signal corresponding to the number of revolutions of the artillery shell, means for counting the number of revolutions of the artillery shell connected to the transducer and responsive to the electric signal, and detonating means connected to the counting means for exploding the artillery shell after a predetermined number of revolutions corresponding to target distance.

References Cited

UNITED STATES PATENTS

| 2,514,359 | 7/1950 | Allison | 102—70.2 |
| 2,754,479 | 7/1956 | Swannel | 318—171.1 X |
| 2,953,094 | 9/1966 | Cohan | 102—82 |
| 3,297,948 | 1/1967 | Kohler | 244—1 X |

OTHER REFERENCES

Littauer, "Pulse Electronics," McGraw-Hill, New York, 1965, TK 7835 L56 C. 2, pp. 508–511.

SAMUEL FEINBERG, *Primary Examiner.*

BENJAMIN A. BORCHELT, *Examiner.*

W. ROCH, *Assistant Examiner.*

UNITED STATES PATENT OFFICE
CERTIFICATE OF CORRECTION

Patent No. 3,353,487                                    November 21, 1967

George H. Perryman

It is hereby certified that error appears in the above numbered patent requiring correction and that the said Letters Patent should read as corrected below.

In the heading to the printed specification, lines 4 and 5, for "assignor to the Bendix Corporation" read -- assignor of one-half to the Bendix Corporation --.

Signed and sealed this 19th day of November 1968.

(SEAL)
Attest:

Edward M. Fletcher, Jr.  
Attesting Officer

EDWARD J. BRENNER  
Commissioner of Patents